Feb. 1, 1966     D. SCIAKY     3,233,075
FUSION WELDING METHOD AND APPARATUS
Filed July 18, 1963     6 Sheets-Sheet 1

Inventor.
David Sciaky.

By Byron Hume Groen & Clement
Attys.

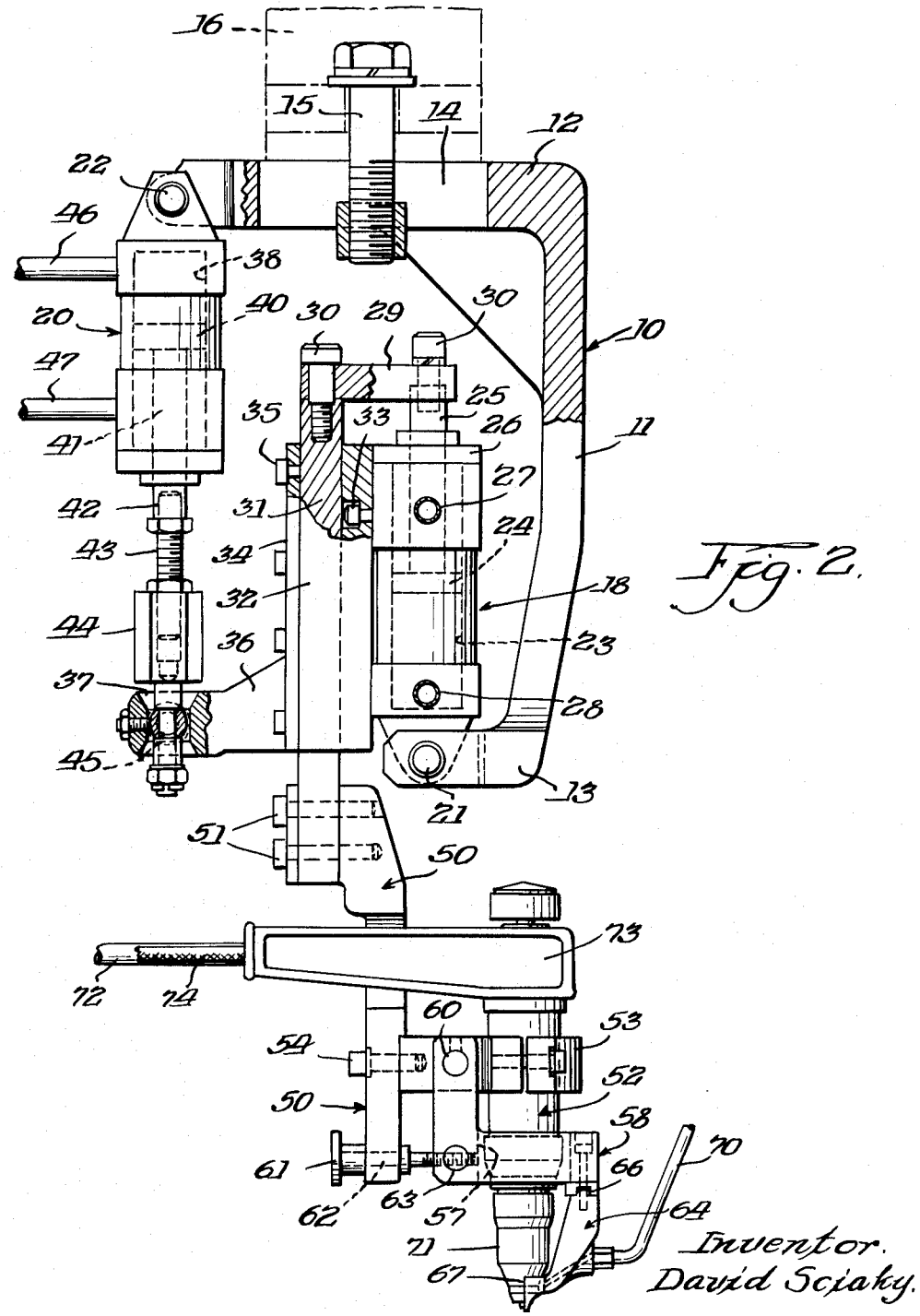

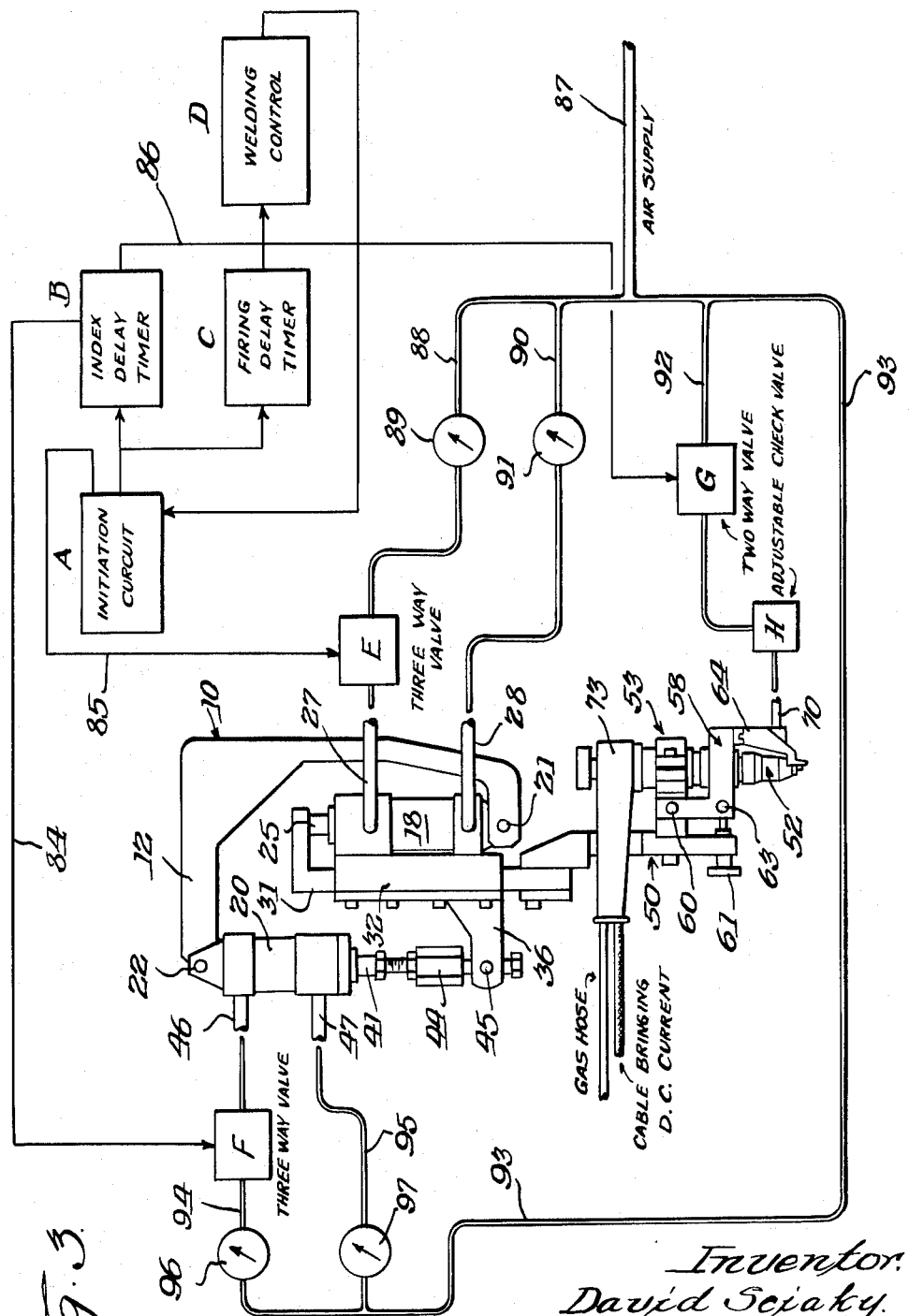

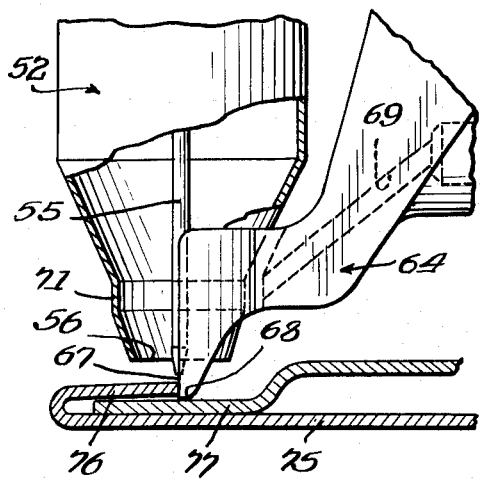
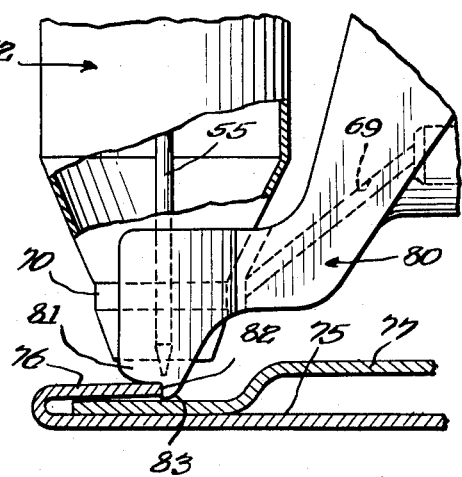
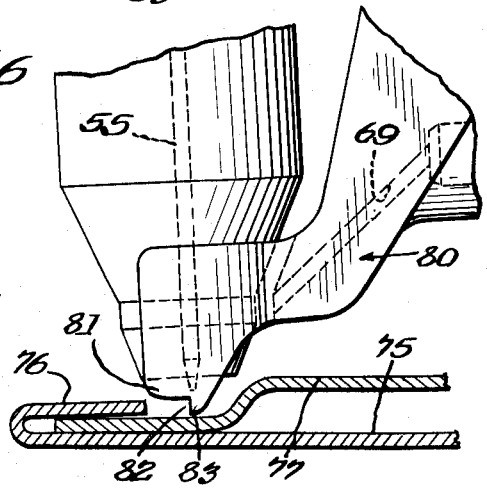
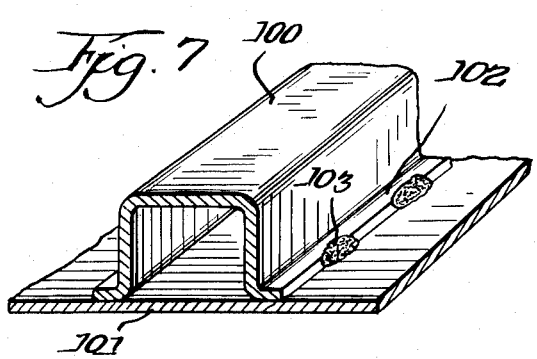
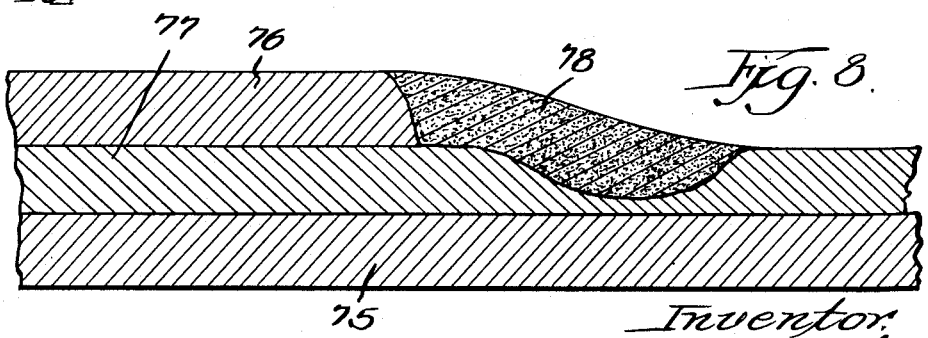

Feb. 1, 1966  D. SCIAKY  3,233,075
FUSION WELDING METHOD AND APPARATUS
Filed July 18, 1963  6 Sheets-Sheet 5
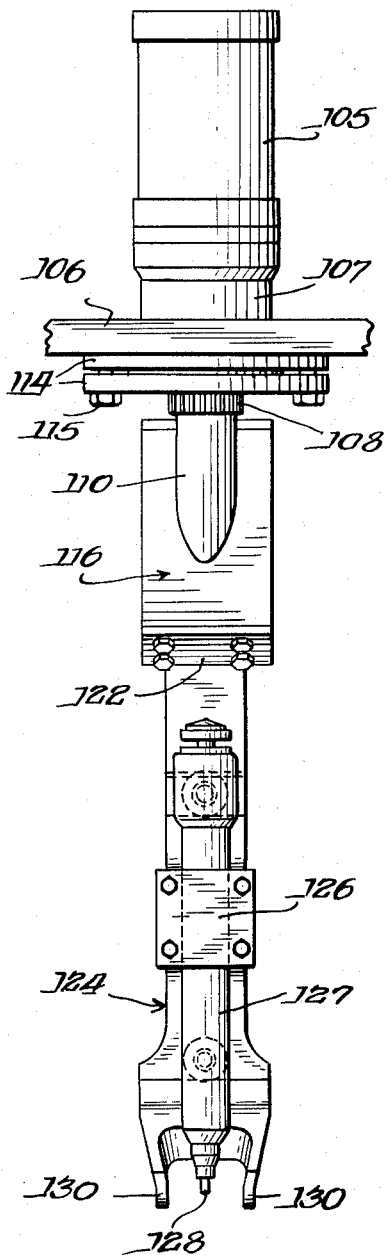
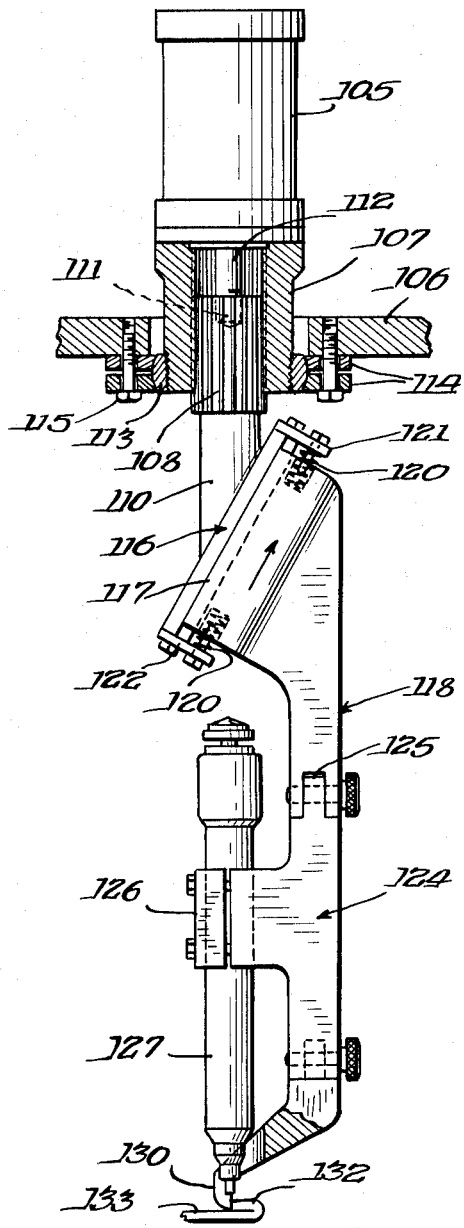
Inventor.
David Sciaky.
By Byron Hume Groen & Clement
Attys.

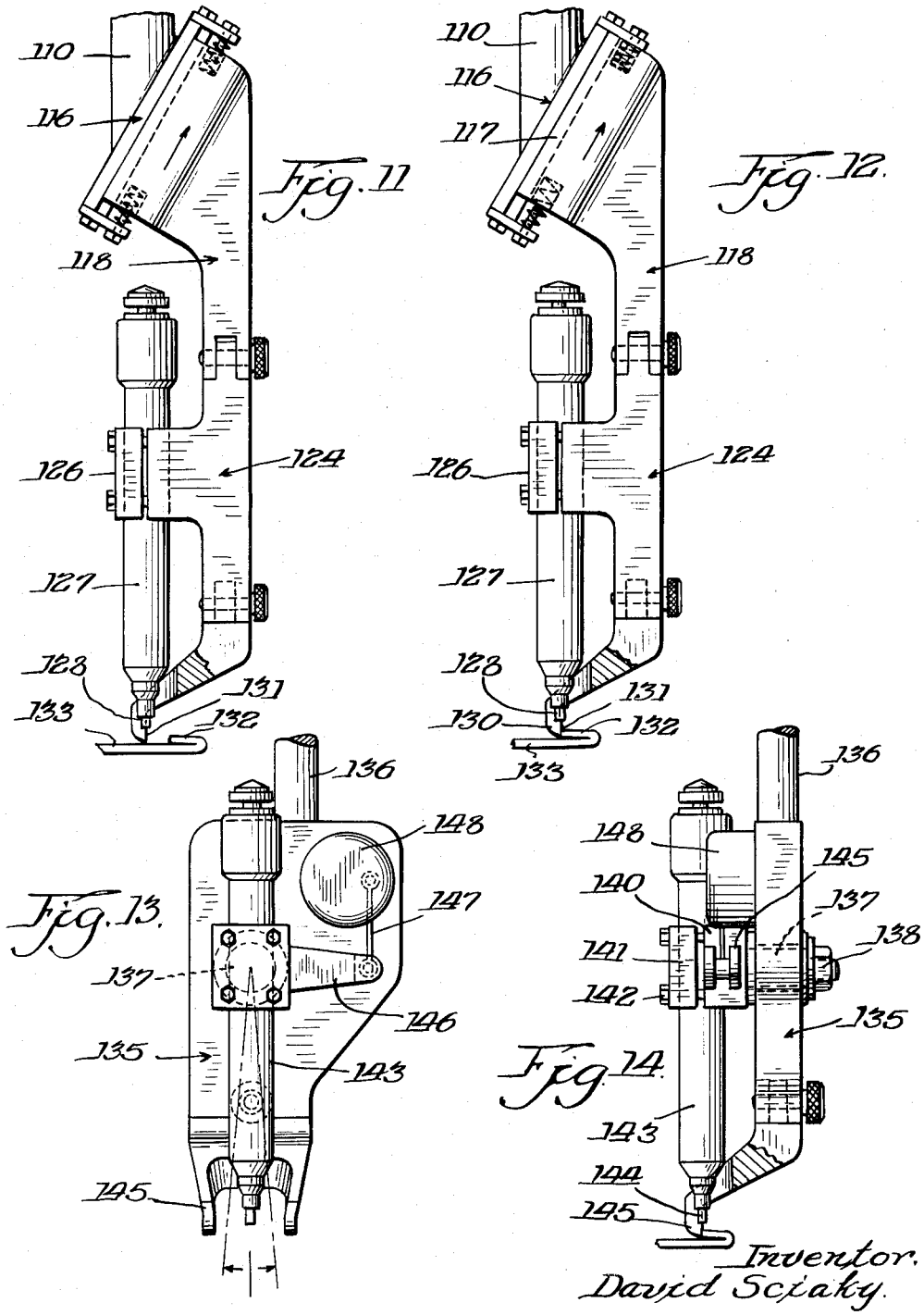

United States Patent Office 3,233,075
Patented Feb. 1, 1966

3,233,075
FUSION WELDING METHOD AND APPARATUS
David Sciaky, Chicago, Ill., assignor to Welding Research, Inc., Chicago, Ill., a corporation of Illinois
Filed July 18, 1963, Ser. No. 295,950
16 Claims. (Cl. 219—127)

The invention relates to the art of welding metals and has reference in particular to a fusion welding method and to new and novel apparatus for performing said welding method.

In the joining of overlapped metal sheets by the well known arc welding process, a regular welding torch is held above the area where a local weld is to be made, and an arc is produced between the electrode tip and the metal workpiece. The electrode is connected to one terminal of the current source and the metal workpiece is connected to the other terminal. It is possible to start the arc by applying momentarily an impulse from an auxiliary high voltage or high frequency source. By proper adjustment of the current intensity and by controlling the duration of the current flow, the metal sheets are melted to a sufficient depth to bring about a spot welding of the workpiece.

In a welding method known as Tig spot welding, the electrode consists of a thin tungsten rod and the same is surrounded by a flow of protective inert gas. At times a short length of steel wire, or metal alloy wire, is fed and melted at the welding area, in order to strengthen the welded joint. In a similar welding method, generally referred to as Mig spot welding, the tungsten rod is omitted and the wire fed into the welding area constitutes the electrode.

The results obtained by the welding method as herein described are not always uniform. Either the welds are too weak, or too large an area is heated, with severe deformation of the welded assembly. Spot welding by the resistance welding method also has inherent defects, due largely to the enormous pressure applied by the electrode in order to maintain the proper contact at the interface between the metal sheets. In the resistance welding of certain automobile parts where the folded edge of an outer panel is welded to an inner panel, the pressure of the electrodes produces a mark on the outer panel surface which must be ground off in order to obtain an unmarred surface for the application of paint. Any such marking of the outer surface of the panel adds to the production costs of the part, in addition to being time consuming, since an extra finishing operation is required.

The fusion welding method of the invention eliminates many objectionable features of the welding methods presently employed, since the enormous pressure of resistance welding is not required and wherein substantially uniform results are obtained by employing a shoe, which predetermines and maintains the proper distance between the electrode tip and the metal flange which is to be spot welded to the outer panel.

A more particular object of the invention is to provide a fusion welding method wherein the gap distance from the electrode tip to the surface of the metal flange is closely controlled by a shoe attached to the electrode holder assembly, and wherein the shoe has a protuberance for contact with the top surface of the flange so that the correct gap distance is maintained at all times, and even when the flange is not uniformly folded against the inner panel.

Another object resides in the provision of a fusion welding method and apparatus for carrying out the method, wherein an arc is produced along the edge of the overlapping flange, to melt the same and form a spot weld or an elongated weld between the flange and the inner panel, and wherein the depth of penetration and character of weld is such that the finished surface of the outer panel is not marred or damaged in any respect.

Another object is to provide a fusion welding method wherein flanged stiffening members can be welded to a panel in a manner to produce a superior joint, since the flanges of the stiffening member can be made extremely narrow with either a spot weld or an elongated weld being produced relatively close to the body of the stiffening member for the strongest and most satisfactory construction.

Another object of the invention is to provide apparatus for producing an elongated weld according to the present fusion welding method, and wherein the electrode holder and shoe are so constructed and arranged that the tip of the electrode may have oscillating movement relative to the shoe, the path of such movement always taking place within the distance between the spaced feet of the shoe.

With these and various other objects in view, the invention may consist of certain novel features of construction and operation, as will be more fully described and particularly pointed out in the specification, drawings and claims appended hereto.

In the drawings which illustrate an embodiment of the electrode holder assembly of the invention, and wherein like reference characters are used to designate like parts—

FIGURE 2 is a view in side elevation of the electrode holder assembly shown in FIGURE 1, with parts in section to better illustrate the mechanical features of the apparatus;

FIGURE 3 is a schematic view showing the electrode holder assembly of FIGURE 1 in connected relation with air supply means for the pressure cylinders and electric circuit means for controlling the same;

FIGURE 4 is a fragmentary view on an enlarged scale showing the electrode projecting end of the holder assembly in combination with a shoe having contact with a workpiece;

FIGURE 5 is a fragmentary view on an enlarged scale similar to FIGURE 4, but showing a modified form of shoe in associated relation with a workpiece;

FIGURE 6 is a fragmentary view similar to FIGURES 4 and 5, but showing the oscillated position of the electrode holder assembly prior to moving the electrode projecting end and shoe into contact with the workpiece;

FIGURE 7 is a perspective view of a workpiece showing elongated spot welds, such as can be produced by the apparatus of the invention;

FIGURE 8 is an enlarged sectional view of a workpiece showing an edge spot weld as produced by the present invention;

FIGURE 9 is a front elevational view of Tig welding apparatus embodying certain modifications coming within the invention;

FIGURE 10 is a side elevational view of the modified form of apparatus shown in FIGURE 9;

FIGURES 11 and 12 are fragmentary views illustrating the mode of operation of the apparatus shown in FIGURES 9 and 10;

FIGURE 13 is a fragmentary front elevational view showing another modified form of apparatus having special utility for producing elongated spot welds; and FIGURE 14 is a side elevational view of the apparatus shown in FIGURE 13.

Figure 1:
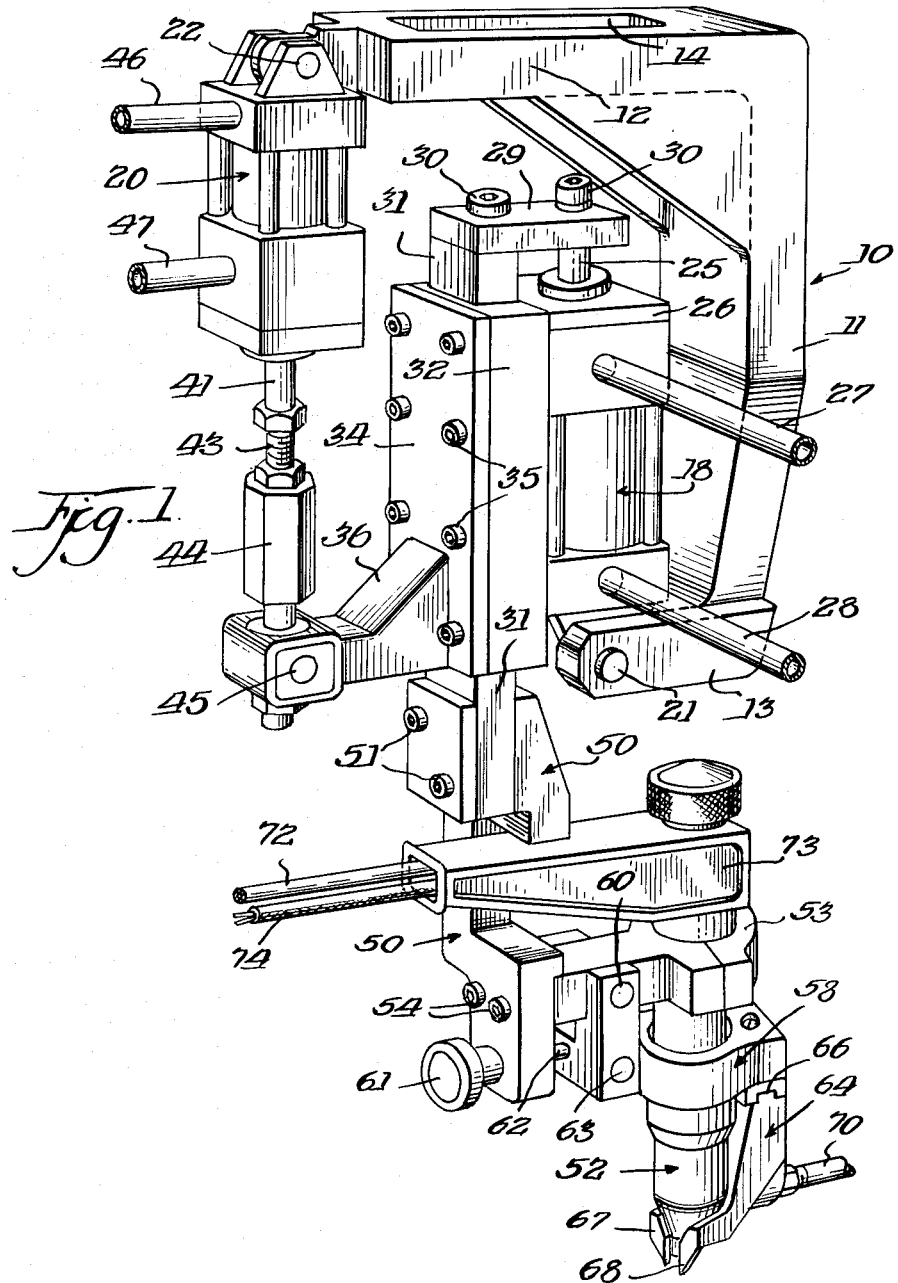
FIGURE 1 is a perspective view of an electrode holder assembly capable of producing spot welds according to the method of the invention.

The electrode holder assembly, FIGURE 1, comprises an embodiment of a device capable of carrying out the fusion welding method of the invention and wherein numeral 10 indicates a supporting frame for the device, the said frame including the central body portion 11, the top supporting leg 12, and the bottom leg 13. The slot 14, FIGURE 2, formed in the top leg 12, is adapted to receive the bolt 15 for suspending the electrode holder assembly from a fixed support such as 16.

Two separate and independent power cylinders 18 and 20 are pivotally connected to the supporting frame at 21 and 22, respectively. The cylinder 18 is constructed and arranged to move the electrode end of the assembly up and down in a vertical direction, and accordingly the interior chamber 23 of the cylinder 18 is provided with a piston 24, having a piston rod 25 which projects through the top closure member 26. The portion of chamber 23 above the piston 24 is supplied with a pressure medium such as air by means of the pipe 27. The chamber below the piston is supplied from the same pressure source by the pipe 28. At its upper projecting end, the piston rod 25 is suitably connected by arm 29 and by the bolt 30 to the slide 31, the slide being suitably mounted for vertical reciprocating movement within the guide member 32. Said guide member is, in turn, secured by bolts such as 33, FIGURE 2, to the power cylinder 18 and the cover 34 for the guide member is secured to the same by the bolts 35. The cover provides an integral bracket 36 which projects forwardly and outwardly of the guide member 32, so that the opening 37 in the end of the bracket is disposed directly below the power cylinder 20.

Whereas the power cylinder 18 is effective to cause reciprocating movement of the slide 31, the power cylinder 20 is effective to cause limited oscillating movement of the entire reciprocating unit on the pivot axis 21. Accordingly, the cylinder 20 is suspended from the pivot axis 22 and the chamber 38 within the cylinder contains the piston 40, having a piston rod 41 which depends below for connection at 42 with the threaded rod 43. An adjustable collar 44 is threaded to rod 43 and said collar provides the laterally extending pivot shaft 45, best shown in FIGURE 1, which pivotally joins the piston rod 41 to the bracket 36, since the extension of the collar passes through the opening 37 in the bracket and has a connection therewith. For actuating the piston 40, the cylinder 20 has two air supply pipes 46 and 47, the pipe 46 connecting therewith above the piston and pipe 47 having a connection below the piston.

The welding unit of the present apparatus is suspended from the slide 31 by the bracket 50, the said bracket being secured to the depending end of the slide by the bolts 51. The electrode holder 52 is held by the clamp 53 which, in turn, is secured by the bolt 54 to the bracket 50. The holder 52 carries an electrode 55, FIGURES 4, 5 and 6, which is mounted on the longitudinal axis of the holder so as to depend a short distance below the terminal end 56 of the holder. The holder extends through the opening 57 provided for the purpose in the shoe supporting bracket 58, and in accordance with the invention, the vertical leg of the bracket 58 is hinged at 60 to the clamp 53. Thus, the shoe supporting bracket 58 is supported from clamp 53 in a manner to permit limited pivotal movement of the bracket with respect to the electrode holder 52. Adjustment of the position of the bracket 58 can be effected by turning the knob 61 which will rotate the shaft 62, mounted in bracket 50. The projecting end of shaft 62 is threaded in the nut 63, the said nut being carried by the bracket 58 at approximately its mid-section.

The function of the bracket 58 is to support the shoe 64, which has a fitted connection with the bracket at 66. The shoe as shown in FIGURE 4 is provided with bifurcated leg portions located on respective sides of the electrode holder 52 as shown in FIGURE 1. Each leg portion has a front edge 67 and a bottom edge 68. An air passage 69 is formed in the shoe and the passage has connection with the air supply pipe 70. Since the electrode holder 52 is fastened to the clamp 53 which is solid with the support 50, the relation of the shoe 64 with respect to the axis of the electrode 55 can be adjusted by rotation of the knob 61.

It will be observed that the electrode holder is tubular, the holder thus providing the circular housing 71 surrounding the electrode 55 and which terminates at 56 in an end of reduced area. As previously stated, the electrode is enveloped with an inert gas during the welding operation and which issues from the end 56 to prevent an oxidizing atmosphere such as air from having contact with the weld during its formation. The inert gas is supplied by the pipe 72 which extends through the tubular cap part 73, the pipe delivering the inert gas to the upper end of the holder. The electric cable 74 also extends through the cap part 73 for connection with the electrode 55, it being understood that the negative terminal of the direct current source is connected to the electrode with the positive terminal being connected to the workpiece.

The welding method of the invention will be clearly understood by referring to the fragmentary views of FIGURES 4, 5 and 6. The workpiece is shown as part of an automobile assembly in the form of a door, hood or trunk lid, wherein an outer panel 75 is formed with a flange 76, which is folded over an inner panel 77, the said inner panel being provided for the purpose of stiffening and reinforcing the assembly.

For spot welding the flange 76 to the inner panel 77, the electrode holder 52, with attached shoe 64, is lowered and moved into position against the edge of the flange 76, with the bottom 68 of the shoe contacting the surface of the inner panel 77. The position of the parts as described is shown in FIGURE 4.

It will be seen that the shoe has a predetermined relation with the electrode, and that this relation remains fixed during the welding operation on the workpiece, and that the same is repeated for each such welding operation. The electrode is located in a precise position in relation to the edge of the flange and the distance between the tip of the electrode and the edge of the flange is also precisely maintained. This distance may vary for different welding conditions, but in general a distance of approximately .040 of an inch is provided for. When the arc is produced a limited area along the edge of the flange and on the inner panel will be melted and a spot weld will be produced without marring the outer surface of the outer panel. The melted area designated by numeral 78 in FIGURE 8 is substantially round, and its diameter is predetermined by the intensity and duration of the arc, by the shape of the electrode, and by the gap between the electrode tip and the flange.

FIGURE 5 is similar to FIGURE 4 except that the shoe 80 is somewhat different from shoe 64, since the shoe 80 has a protuberance 81 immediately above the vertical edge 82. The edge 82 is adapted to contact the edge of the flange 76 in the same manner as described for the vertical edge 67 of shoe 64. FIGURE 5 shows the edge 82 in contact with the flange 76 and accordingly the protuberance 81 has contact with the top surface of the flange 76. Thus the shoe 80 is also effective in predetermining the precise distance between the electrode tip and the workpiece, the workpiece including both the flange and the inner panel. This accurate positioning of the electrode tip with respect to the edge of the flange and the maintenance of a precise gap distance is achieved independently of the variations in the width of the flange.

A welding sequence is started by energizing the initiation circuit A which in turn initiates the index delay timer B, the firing delay timer C, and energizes the valve E. The index delay timer B is electrically connected by the conductors 84 and 86 to the solenoid valves F and G. Air under pressure for the power cylinders is supplied by the pipe 87. One branch line 88 includes a pressure regulator 89 and the three-way solenoid valve E, the said valve being connected to pipe 27 of cylinder 18. A second branch line 90 includes a pressure regulator 91 and which connects with the pipe 28 of the cylinder 18. The third branch line 92 includes the two-way valve G and the adjustable check valve H which has connection with pipe 70. A further branch line 93 supplies compressed air to the cylinder 20 by means of the conduits 94 and 95, each including a pressure regulator 96 and 97. Conduit 94 includes the three-way valve F which connects with pipe 46 of the cylinder 20. The conduit 95 connects with the pipe 47.

When valve E is actuated by the initiation circuit, the chamber above the piston 24 of cylinder 18 is pressurized and the slide 31 is caused to move downwardly. The downward motion of the slide continues until the shoe comes in contact with the workpiece and stops this motion. At this time the shoe assumes the position illustrated in FIGURE 6. The shoe is now in an operative relation with the workpiece, but at a distance away from the edge of the flange. The index delay timer times out, the three-way valve F is now actuated to pressurize the chamber below piston 40 of cylinder 20, and the entire reciprocating unit including electrode and shoe are indexed in a clockwise direction to cause the shoe to contact the edge of the flange. The movement of the shoe is stopped when it contacts the flange and thus the tungsten electrode is brought into the required predetermined position relative to the edge of the flange. The firing delay timer C now signals the welding control D which brings about the initiation of the arc and times the passage of the welding current. The starting of the arc is synchronized with the sine wave of the power line alternating current. A discrete and precise number of cycles determines the duration of the arc and which is also accurately controlled as to current intensity.

At the end of the welding time, a signal from the welding control releases the initiating circuit A. This deenergizes the three-way valves E and F, which releases the pressure in the cylinder 18 above the piston and also releases the pressure in the cylinder 20 below the piston. The air on the opposite sides of the respective pistons is maintained at a constant but somewhat lower pressure than the air controlled by the three-way valves. This constant back pressure returns the power cylinders to their reset positions and holds the parts for the next welding operation.

Immediately in advance of the welding operation the two-way valve G is actuated to supply a blast of air through pipe 70 and passage 69 onto the workpiece in the area to be welded, for cleaning the area by removing dust, dirt and similar particles. The blast is terminated before welding begins and the adjustable poppet valve stops the air flow completely upon closing of valve G.

The workpieces as shown in FIGURE 7 employ stiffening members such as 100 and which are welded to a panel 101. Heretofore the flanges 102 of the stiffening member have been spot welded by resistance welding methods which require that the flanges have a width sufficient to provide the necessary bearing area for the electrode. The wide flanges increase the weight of the stiffeners. Moreover, the distance of the welded area from the body of the stiffener is increased and the strength of the joint is thus weakened. By spot welding the edge of the flange 102 to the panel 101 by the method of the present invention, a superior joint is produced since the flanges can be made extremely narrow and the spot welds 103 can be located relatively close to the body of the stiffeners.

FIGURES 9 and 10 disclose a form of Tig welding apparatus which embodies certain improvements and modifications for automatically locating the electrode with respect to the edge of the flange when the workpiece is moved into contact with the shoe. The air cylinder 105 and the supporting bracket 106 are suitably positioned as shown, with the parts having an adjustable connection with each other as will be presently described. The collar 107 of the air cylinder is provided with internal teeth for receiving the splined end 108 of the support 110. The said support is secured at 111 to the piston rod 112 of the air cylinder. The lower end of collar 107 is threaded for receiving the semi-spherical nut 113 and said nut is clamped by the spaced plates 114, which are in turn secured to the bracket by the screws 115. The nut 113 and the manner in which it is clamped provides a universal joint for the support 110.

The end of the support opposite the spline 108 is integral with a slide 116, the slide mounting the specially formed end 117 of the arm 118 which carries the electrode assembly. The end 117 of the arm is cored top and bottom for receiving the coil springs 120. The arrangement provides an angularly disposed slide for the arm 118, the end 117 of which is normally maintained centrally located within the end plates 121 and 122, and thus equidistance with respect to the ends of the slide.

The arm 118 has a shoe 124 releasably fixed thereto at 125 and the said shoe has clamped thereto at 126 the electrode assembly 127. The tip of the electrode 128 extends a short distance below the housing of the assembly and the shoe is bifurcated to form spaced locating portions such as 130, FIGURE 9. It will be noted that the portions 130 are located on respective sides of the electrode and that the said portions have a straight edge 131 at their rear for contact with the edge of a flange such as 132, which is to be welded to the panel 133 of the workpiece. As previously described the tip of the electrode has a predetermined fixed relation with the portions 130 of the shoe so that with the shoe in contact with the workpiece the said tip will be spaced the desired gap distance for the most efficient welding.

In this modification of the invention the workpiece is moved into contact with the shoe and the apparatus employs the angular slide arrangement 116 to automatically cause the straight edge 131 of the shoe to contact the edge of the flange 132. The mode of operation is best illustrated in FIGURES 11 and 12. When contact between the parts is first made as shown in FIGURE 11, the shoe and the electrode tip are displaced to the left of the flange. Upon additional upward movement of the workpiece the support arm 118 is caused to move within the slide 116 in a direction towards the right due to the angular positioning of the slide. Thus in FIGURE 12 the coil spring 120 at end 121 is compressed and the shoe has been shifted to the right to bring the portions 130 into contact with the flange of the workpiece. Any additional upward travel of the workpiece will be taken up by the splined structure 108 and the air cylinder 105. To insure the desired coaction between the workpiece and the shoe the entire assembly is capable of vertical and angular adjustment. Vertical adjustment is provided for by the threaded connection of the collar 107 with the nut 113. Angular adjustment of the assembly is made possible by the nut 113 and the manner in which it is clamped by the plates 114.

To produce an elongated weld such as shown in FIGURE 7 instead of a round spot weld, it is required that the electrode move along the flange for a preset distance and at a preset speed during the welding operation. The modified apparatus shown in FIGURES 13 and 14 will operate in this manner. The shoe 135 is preferably an integral part of the depending support 136 and said shoe provides the forwardly extending pivot shaft 137 which is fixed to the shoe in desired adjusted position by the securing nut 138. The pivot shaft 137 forms a mounting for the clamping structure 140. By means of the plate 141 and the screws 142, the structure has clamped thereto the electrode assembly 143 having an electrode 144 and which is thus capable of oscillating movement between the spaced locating portions 145 of the shoe. The arm 146 is part of the clamping structure and said arm is suitably joined by the link 147 to the actuating mechanism 148.

The mechanism 148 will function as a power unit for imparting oscillating movement to the electrode assembly, and thus the same may be electrical, mechanical, pneumatic or hydraulic. Accordingly, the tip end of the electrode 144 can be caused to move back and forth within the spaced portions of the shoe and produce an elongated weld. The motion of the electrode may consist of a slow single sweep, a multiple index, or a rapid oscillating movement. Linear movement may be substituted for the pivoting motion in those specific applications requiring such movement.

In all modifications of the invention, one of the basic advantages in producing a weld at the edge of the flange is that the weld can be easily seen and inspected without resorting to destructive tests. Also, by welding at the edge of the flange less heat input is required and metal finishing on the show surface of the workpiece is eliminated. The action of the shoe is to provide a sensing system to insure that every weld is placed exactly on the edge of the flange and which can be accomplished independently of flange width variations. Because low pressure welds are possible with the present welding method an additional benefit is realized in that a massive welding press is not required. A simple lifting mechanism or table top type fixture can be utilized and the welding press can be completely eliminated.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In a fusion welding method for welding a metal flange to a metal panel, the steps which comprise moving a tungsten electrode into a definite positional relation with the edge of the flange and spacing the electrode tip from the flange a predetermined distance, producing an arc between the electrode and the edge of the flange and the panel whereby to melt the metal of the respective parts and form a spot weld, terminating the welding operation, and then withdrawing the electrode.

2. In a fusion welding method for welding a metal flange to a metal panel, the steps which comprise lowering a tungsten electrode into close relation with the flange but spaced a distance from and laterally of the flange, moving the electrode into substantial alignment with the edge of the flange and spacing the electrode tip a predetermined distance from the edge, producing an arc between the electrode and the edge of the flange and the panel whereby to melt the metal of the respective parts and form a spot weld, terminating the welding operation, and then withdrawing the electrode.

3. In a fusion welding method for welding a metal flange to a metal panel, the steps which comprise moving a tungsten electrode into a definite positional relation with the edge of the flange, spacing the electrode tip from the flange a predetermined distance by means of a shoe having a preset relation with the electrode tip, producing an arc between the electrode and the edge of the flange and the panel whereby to melt the metal of the respective parts and form a spot weld, controlling the intensity and duration of the electric current in the production of the welding arc, terminating the welding operation, and then withdrawing the electrode.

4. In a fusion welding method for welding a metal flange to a metal panel, the steps which comprise lowering a tungsten electrode into close relation with the flange but spaced a distance from and laterally thereof, moving the electrode into alignment with the edge of the flange and spacing the electrode tip a predetermined distance from the edge by means of a shoe having a preset relation with the electrode tip, the shoe being caused to engage the flange and the panel, producing an arc between the electrode and the edge of the flange and the panel whereby to melt the metal of the respective parts and form a spot weld, terminating the welding operation, and then withdrawing the electrode.

5. In welding apparatus for spot welding a metal flange to a metal panel, an electrode holder providing an electrode the tip of which extends a short distance below the terminal end of the holder, a shoe carried by the holder and said shoe having a preset relation with the electrode, said shoe providing a terminal end adapted to have contact with the metal panel during a welding operation, and said shoe additionally providing a front edge which is adapted to have contact with the edge of the flange during a welding operation.

6. In welding apparatus as defined by claim 5, additionally including means for manually adjusting the preset relation which the shoe has with the electrode.

7. In welding apparatus as defined by claim 5, additionally including means pivotally supporting the combined holder and shoe for pivotal movement in a direction at right angles with respect to the edge of the flange, power cylinder means for oscillating the combined holder and shoe in said direction, and other power cylinder means for reciprocating the combined holder and shoe in directions towards and from the top surfaces of the flange and panel.

8. In welding apparatus for spot welding a workpiece including a metal flange and a metal panel, an electrode holder providing an electrode the tip of which extends a short distance below the terminal end of the holder, a shoe carried by the holder and said shoe having a preset relation with the electrode, said shoe providing a terminal end and said shoe additionally providing a front edge and a forwardly projecting front protuberance immediately adjacent the terminal end, said front edge and the undersurface of the protuberance being adapted to have contact respectively with the edge of the flange and the top surface of the flange during a welding operation.

9. In a fusion welding method for a workpiece wherein a metal flange is to be welded to a metal panel, the steps which comprise producing relative movement between an electrode and said workpiece to position the electrode in alignment with the edge of the flange but spaced from said edge a predetermined distance, producing an arc between the electrode and the edge of the flange and the panel, whereby to melt the metal of the respective parts and from a weld, terminating the welding operation, and again producing relative movement between the electrode and the workpiece to locate the elements in their original position.

10. In a fusion welding method for a workpiece wherein a metal flange is to be welded to a metal panel, the steps which comprise producing relative movement between an electrode and said workpiece to position the electrode in alignment with the edge of the flange, spacing the electrode tip from the edge a predetermined distance by means of a shoe having a preset relation with the electrode tip, producing an arc between the electrode and the edge of the flange and the panel whereby to melt the metal of the respective parts and form a weld, controlling the intensity and duration of the electric current in the production of the welding arc, terminating the welding operation, and then producing relative movement between the electrode and the workpiece to locate the elements in their original position.

11. In a fusion welding method for a workpiece wherein a metal flange is to be welded to a metal panel, the steps which comprise producing relative movement between an electrode and said workpiece to position the electrode in alignment with the edge of the flange, spacing the electrode tip from the edge a predetermined distance by means of a shoe having a preset relation with the electrode tip, producing an arm between the electrode and the edge of the flange and the panel whereby to melt the metal of the respective parts, moving the tip of the electrode in a direction parallel with the edge of the flange during the production of the arc whereby to produce an elongated weld, terminating the welding operation, and again producing relative movement between the electrode and the workpiece to locate the elements in their original position.

12. In welding apparatus for welding a workpiece, in combination, a shoe having a part for contacting the workpiece during a welding operation, an electrode holder providing an electrode the tip of which extends a short distance below the holder, means fixedly joining the electrode holder and shoe in a predetermined relation, an extending shaft providing a slide disposed at an angle to the longitudinal axis of the electrode holder, said shoe having a second part interfitting with said slide, resilient means at respective ends of the slide for normally maintaining the second part of the shoe centrally positioned within the slide, and means for supporting said shaft.

13. In welding apparatus for welding a workpiece as defined by claim 12, wherein the means for supporting said shaft includes a universal joint whereby the position of the electrode holder, shoe and slide as a unitary assembly can be adjusted with respect to the workpiece.

14. In welding apparatus for welding a workpiece as defined by claim 12, wherein said supporting means for supporting said shaft includes spline structure preventing rotation of the shaft but permitting movement axially thereof, and additional means yieldingly supporting the shaft for axial movement in both directions.

15. In welding apparatus for welding a workpiece wherein a metal flange is to be welded to a metal panel, in combination, a shoe having a part for contacting the workpiece during a welding operation, an electrode holder providing an electrode the tip of which extends a short distance below the holder, means pivotally mounting the electrode holder on said shoe whereby the holder and said electrode may oscillate with respect to the shoe, and means carried by the shoe for effecting oscillating movement of the electrode holder.

16. In welding apparatus for welding a workpiece wherein a metal flange is to be welded to a metal panel as defined by claim 15, wherein the part of said shoe adapted to contact the workpiece during a welding operation is bifurcated to provide spaced leg portions, and wherein the means for effecting said oscillating movement is so constructed and arranged that the path of movement of the tip of the electrode is always within the spaced bifurcated legs of the shoe.

References Cited by the Examiner

UNITED STATES PATENTS

| 2,680,797 | 6/1954 | McDaniel | 219—130 |
| 3,005,902 | 10/1961 | Capleston et al. | 219—127 |

RICHARD M. WOOD, *Primary Examiner.*